(12) United States Patent
Noguchi

(10) Patent No.: US 7,612,862 B2
(45) Date of Patent: Nov. 3, 2009

(54) LIQUID CRYSTAL DEVICE

(75) Inventor: Kenji Noguchi, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 0 days.

(21) Appl. No.: 12/052,439

(22) Filed: Mar. 20, 2008

(65) Prior Publication Data

US 2008/0231787 A1 Sep. 25, 2008

(30) Foreign Application Priority Data

Mar. 22, 2007 (JP) ............................. 2007-074564
Feb. 6, 2008 (JP) ............................. 2008-026612

(51) Int. Cl.
*C09K 19/02* (2006.01)
(52) U.S. Cl. ................... 349/184; 349/123; 349/125; 349/171; 349/172
(58) Field of Classification Search .................. 349/184
See application file for complete search history.

(56) References Cited

U.S. PATENT DOCUMENTS 5,751,391 A * 5/1998 Yokoyama et al. .......... 349/153
5,863,458 A * 1/1999 Miyata et al. .......... 252/299.01
5,963,190 A * 10/1999 Tsuboyama et al. .......... 345/103
6,191,771 B1* 2/2001 Kondoh ....................... 345/100
6,266,115 B1* 7/2001 Fujikawa et al. ............. 349/133

FOREIGN PATENT DOCUMENTS

| JP | 4-355433 | 12/1992 |
| JP | 10-239664 | 9/1998 |
| JP | 2006-23481 | 1/2006 |

* cited by examiner

*Primary Examiner*—Frank G. Font
*Assistant Examiner*—Mary A El Shammaa
(74) *Attorney, Agent, or Firm*—Finnegan, Henderson, Farabow, Garrett & Dunner, L.L.P.

(57) ABSTRACT

An object of the invention is to provide a liquid crystal device that uses a smectic liquid crystal and that can produce a uniform display. The liquid crystal device includes a pair of substrates, a smectic liquid crystal provided between the pair of substrates, an injection hole for injecting therethrough the smectic liquid crystal into a gap formed between the pair of substrates, a plurality of scanning electrodes arranged at right angles to the direction of injection of the smectic liquid crystal between the pair of substrates, an alignment film deposited over the plurality of scanning electrodes, and voltage applying means for applying a voltage to the plurality of scanning electrodes in sequence proceeding from a side nearest to the injection hole toward a side farthest therefrom.

5 Claims, 9 Drawing Sheets

FIRST FERROELECTRIC STATE — SECOND FERROELECTRIC STATE

PRIOR ART

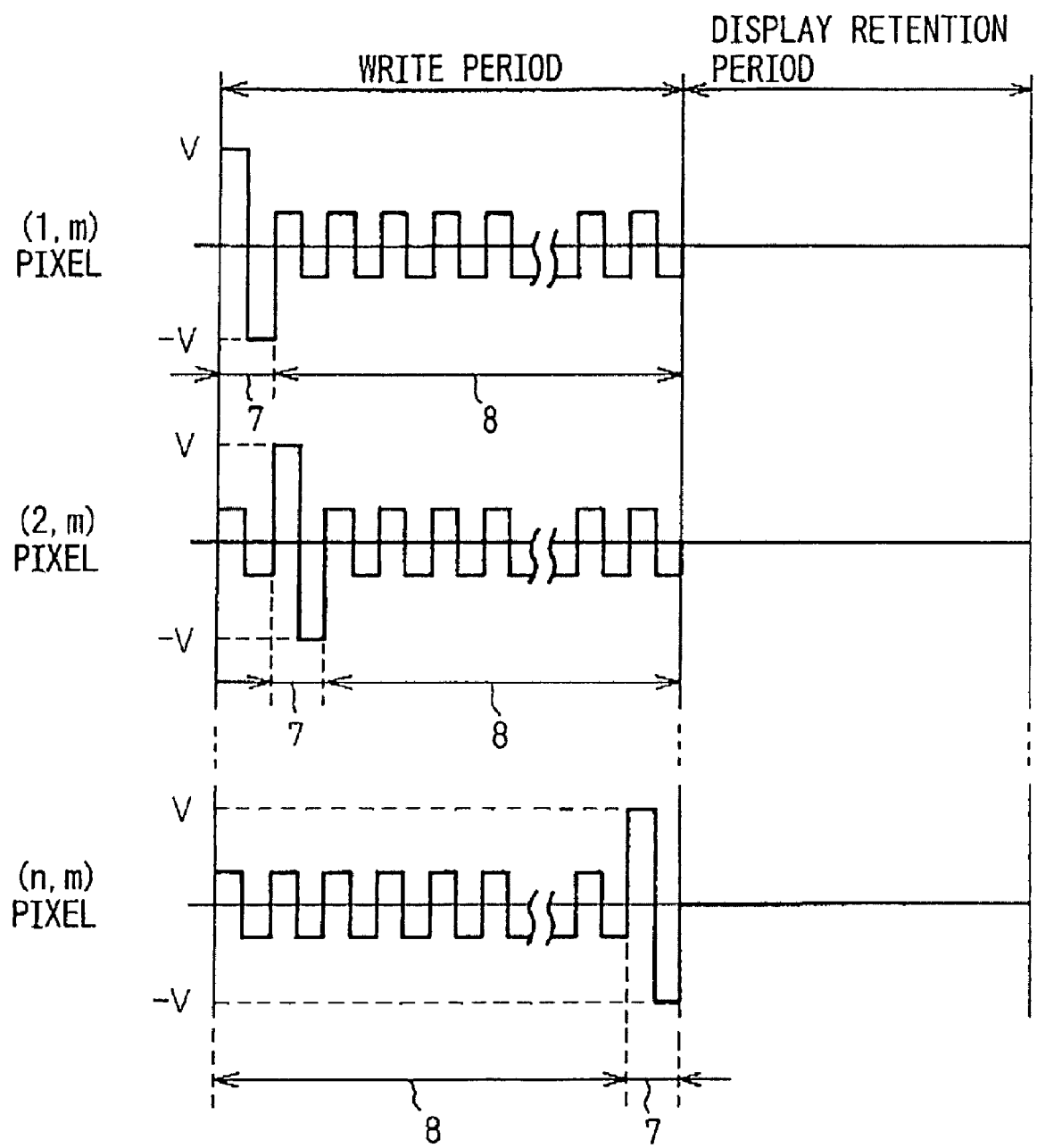

LIQUID CRYSTAL DEVICE

The entire contents of Japanese Patent Applications No. 2007-74654 and No. 2008-26612 are hereby incorporated by reference.

FIELD OF THE INVENTION

The present invention relates to a liquid crystal device that uses a liquid crystal having an electro-optical effect, and more particularly to a liquid crystal device that uses a smectic liquid crystal as the liquid crystal.

BACKGROUND OF THE INVENTION

Ferroelectric liquid crystals and antiferroelectric liquid crystals are generally known as being liquid crystals that exhibit smectic phases. These liquid crystals are used in image-producing displays by utilizing the properties that both types of liquid crystals possess spontaneous polarization and that the direction of the spontaneous polarization changes under the influence of an external electric or magnetic field. It is reported by Clark et al. that liquid crystal electro-optical devices using ferroelectric liquid crystals have memory characteristics and are capable of fast response.

Ferroelectric liquid crystal is capable of exhibiting a plurality of optical states, and has the characteristic that it continues to retain a particular state even after removal of applied voltage. When an external force such as an electric field is applied, ferroelectric liquid crystal molecules lie in one of two stable positions on the lateral surface of a cone (liquid crystal cone). In a liquid crystal display device constructed by sandwiching such a ferroelectric liquid crystal between a pair of substrates, the ferroelectric liquid crystal is controlled so that the liquid crystal molecules lie in one of the two stable positions in accordance with the polarity of the voltage applied across the ferroelectric liquid crystal. One of the two stable states is called the first ferroelectric state, and the other is called the second ferroelectric state.

FIG. 1 shows one configuration example of a liquid crystal panel 20 that uses a ferroelectric liquid crystal 10. In FIG. 1, polarizers 15a (the direction of its polarization axis is designated by "a") and 15b (the direction of its polarization axis is designated by "b") are arranged in a crossed Nicol configuration. Here, the ferroelectric liquid crystal 10 is oriented so that the long axis direction of the liquid crystal molecules in the second ferroelectric state coincides with the polarization axis "a". Accordingly, in the first ferroelectric state, the long axis direction of the liquid crystal molecules coincides with the direction of the other position on the liquid crystal cone.

When the polarizers 15a and 15b and the ferroelectric liquid crystal 10 are arranged as shown in FIG. 1, and the ferroelectric liquid crystal 10 is put in the second ferroelectric state by changing the polarity of the applied voltage (the long axis direction of the liquid crystal molecules in the ferroelectric liquid crystal 10 coincides with the polarization axis "a" of the polarizer 15a), light is not transmitted through the liquid crystal and the liquid crystal panel 20 thus produces a black display (non-transmission state). On the other hand, when the ferroelectric liquid crystal 10 is put in the first ferroelectric state by changing the polarity of the applied voltage (the long axis direction of the liquid crystal molecules in the ferroelectric liquid crystal 10 does not coincides either with the polarization axis "a" of the polarizer 15a or with the polarization axis "b" of the polarizer 15b), since the long axis direction of the liquid crystal molecules is tilted at a certain angle relative to the polarization axes, light, for example, from a backlight is transmitted trough the liquid crystal and the liquid crystal panel 20 thus produces a white display (transmission state). A light source other than the backlight may be used to produce the display.

Next, the switching of the ferroelectric liquid crystal 10, i.e., the transition from one ferroelectric state to the other ferroelectric state, will be described with reference to FIG. 2. As shown in FIG. 2, when the voltage applied to the ferroelectric liquid crystal 10 is increased, the voltage value at which light transmittance begins to increase is denoted by V1, and the voltage value at which the transmittance reaches saturation when the voltage is further increased is denoted by V2 (positive threshold). Then, when the voltage applied to the ferroelectric liquid crystal 10 is decreased, the voltage value at which the transmittance begins to drop is denoted by V3, and the voltage value at and beyond which the transmittance does not drop further even when the voltage is further decreased is denoted by V4 (negative threshold). Here, the state in which the transmittance is high corresponds to the first ferroelectric state, and the state in which the transmittance is low corresponds to the second ferroelectric state.

For example, when a voltage greater than V2 is applied to the ferroelectric liquid crystal 10, the ferroelectric liquid crystal transitions to the first ferroelectric state, and thereafter the ferroelectric liquid crystal retains the first ferroelectric state even when no voltage is applied, i.e., when 0 V is applied. Likewise, when a voltage greater in magnitude than V4 is applied to the ferroelectric liquid crystal, the ferroelectric liquid crystal transitions to the second ferroelectric state, and thereafter the ferroelectric liquid crystal retains the second ferroelectric state even when no voltage is applied, i.e., when 0 V is applied. In this way, once switched to a given ferroelectric state, the ferroelectric liquid crystal retains that state even after removal of the applied voltage. Such a ferroelectric liquid crystal is described, for example, in patent document 1.

In the liquid crystal panel using the ferroelectric liquid crystal, the molecules of the liquid crystal sandwiched between a pair of substrates each having an alignment film align themselves in a bookshelf- or chevron-like layer structure. The liquid crystal molecules can be driven parallel to the surfaces of the substrates by applying a pulsed electric field. When constructing a display device having a memory characteristic by using a ferroelectric liquid crystal, SiO alignment films are used.

FIG. 3 is a diagram showing the configuration of a liquid crystal cell 22 and the arrangement of polarizers when constructing a display using an antiferroelectric liquid crystal. The liquid crystal cell 22 is placed between the polarizers 21a and 21b arranged in a crossed Nicol configuration, the liquid crystal cell being set up so that the average long axis direction of the molecules in the absence of an applied voltage is substantially parallel to the polarization axis of either one of the polarizers and so that it can produce a black display when no voltage is applied and a white display when a voltage is applied.

FIG. 4 is a diagram showing the relationship between the applied voltage and the transmittance of the liquid crystal cell 22 constructed using the antiferroelectric liquid crystal. The voltage value at which the transmittance begins to change when the applied voltage is increased is denoted by V11, and the voltage value at which the transmittance reaches saturation is denoted by V12, while the voltage value at which the transmittance begins to drop when the applied voltage is decreased is denoted by V15. Further, when a voltage of opposite polarity is applied, the voltage value at which the transmittance begins to change when the absolute value of the applied voltage is increased is denoted by V13, and the voltage value at which the transmittance reaches saturation is denoted by V14, while the voltage value at which the transmittance begins to change when the absolute value of the applied voltage is decreased is denoted by V16.

As shown in FIG. 4, the first ferroelectric state is selected when the voltage is greater than the threshold of the antiferroelectric liquid crystal molecules. When the voltage of opposite polarity is applied, the second ferroelectric state is selected. In this way, in the antiferroelectric liquid crystal, when the voltage drops below a certain threshold from the ferroelectric state, an antiferroelectric state is selected. Such an antiferroelectric liquid crystal is described, for example, in patent document 2.

FIG. 5 is a diagram showing a region where the alignment tends to become unstable in a liquid crystal device constructed using a ferroelectric liquid crystal and an SiO alignment film. In FIG. 5, the ferroelectric liquid crystal injected through an injection hole 3 is sealed between two glass substrates 1 by a sealing member 2. Here, the region 6 is the region where the alignment tends to become unstable.

A smectic liquid crystal such as a ferroelectric liquid crystal is a mixture composed of a plurality of substances in prescribed proportions, and has a high viscosity. On the other hand, the SiO forming the alignment film is a porous material, in particular, when the film is deposited by evaporation, the surface is active. In this condition, when the smectic liquid crystal is injected through the injection hole, and a chromatographic phenomenon occurs between the liquid crystal and the alignment film, the substances forming the liquid crystal are adsorbed on the alignment film, and the composition of the liquid crystal gradually changes as the injection progresses. As a result, the composition of the liquid crystal becomes different between a region near the injection hole and a region far from it, and in the region far from the injection hole, the alignment state of the liquid crystal tends to become unstable, and display unevenness tends to occur.

Patent document 3 discloses a liquid crystal display device in which scanning electrodes are arranged in parallel to the direction of injection of the liquid crystal, with provisions made to apply a scanning signal from the side opposite to the injection hole in order to eliminate the display unevenness resulting from the unevenness of density of the liquid crystal material and to achieve uniform display quality. In patent document 3, it is described that highly polar components contained in the liquid crystal material are adsorbed on the alignment film during the injection of the liquid crystal, causing the density profile of the liquid crystal material to vary according to the distance from the injection hole. When the density profile of the liquid crystal material varies, a varying driving voltage profile is generated across the liquid crystal device such that the driving voltage is low in regions near the injection hole and high in regions far from it. Further, a voltage drop occurs due to the effect of the sheet resistance of the scanning electrodes, and the applied voltage varies according to the electrode position. In view of this, the liquid crystal display device disclosed in patent document 3 employs the configuration in which the scanning electrodes are arranged in parallel to the direction of injection of the liquid crystal and the scanning signal is applied from the side opposite to the injection hole. It is described that, with this configuration, the driving voltage profile resulting from the density profile of the liquid crystal material and the voltage drop resulting from the sheet resistance of the scanning electrodes compensate each other, and as a result, a proper scanning voltage can be applied and uniform display quality obtained.

Patent document 1: Japanese Unexamined Patent Publication No. 2006-23481 (FIGS. 1 and 2)
Patent document 2: Japanese Unexamined Patent Publication No. H10-239664 (FIGS. 2 and 3)
Patent document 3: Japanese Unexamined Patent Publication No. H4-355433 (Page 3, FIG. 2)

SUMMARY OF THE INVENTION

Specifically, in the case of the smectic liquid crystal, it has been discovered that, in the region where the alignment state of the liquid crystal tends to become unstable, since a pulse lower than the threshold voltage is repeatedly applied the liquid crystal of homogeneous alignment tends to change to twisted alignment, causing display unevenness.

FIG. 6 is a diagram showing voltages applied to respective pixels when a display device having a memory characteristic constructed using a ferroelectric liquid crystal is driven by passive matrix driving with a plurality of scanning electrodes and signal electrodes formed in a strip-like pattern. FIG. 6(a) shows the drive pulses applied to the first, second, and n-th scanning electrodes, respectively, and FIG. 6(b) shows the drive pulses applied to the signal electrodes. FIG. 7 shows the drive voltages applied to the pixels on the respective scanning electrodes. In FIG. 7, a selection period 7 during which a select pulse is applied and a non-selection period 8 during which a non-select pulse is applied are shown.

In the display device having a memory characteristic, the screen display once written does not disappear but continues to remain in that state. To rewrite the still image screen, the whole screen must be rewritten by scanning all the scanning electrodes once. Accordingly, the display device having a memory characteristic has a write period during which all the scanning electrodes are scanned and an image display retention period during which no voltage is applied. To produce a desired screen display, it is only necessary to apply a voltage during the write period, and no voltage need be applied during the screen display retention period.

In the write period, a scanning pulse of $\pm\frac{2}{3}$ V is applied to the scanning electrodes in sequence starting with the first scanning electrode, while a signal pulse of $\pm\frac{1}{3}$ V corresponding to a white or black display state is applied to each signal electrode. The drive voltage applied to each pixel is the sum of the voltages applied to the corresponding scanning and signal electrodes.

As shown in FIG. 7, a voltage $\pm$V greater than the threshold voltage for driving the liquid crystal is applied during the selection period 7 to produce a white or black display. The non-select pulse is a voltage of $\pm\frac{1}{3}$ V which is smaller than the threshold voltage. At the pixel (1, m) located on the first scanning electrode, after the select pulse is applied, the non-select pulse is applied repeatedly during the non-selection period 8 until all the other scanning electrodes are scanned. On the other hand, at the pixel (n, m) located on the n-th scanning electrode which is the last electrode to be scanned, after the non-select pulse is repeatedly applied, the select pulse is applied at the end of the period.

FIG. 8 shows a ferroelectric liquid crystal device in which scanning electrodes 4 are arranged in parallel to the direction of injection of the liquid crystal, i.e., the direction in which the liquid crystal is injected. A plurality of signal electrodes 5 are arranged at right angles to the scanning electrodes 4. In this configuration, the scanning electrodes 4 are scanned in sequence from top to bottom in the figure along the direction indicated by arrow. At the pixel 9 (l, m) on the first selected scanning electrode 4, first the select pulse is applied as shown in FIG. 7, to produce a white or black display. After that, the voltage ±⅓V as the non-select pulse is applied repeatedly as many times as the number of remaining scanning lines. At a pixel located on a low-numbered scanning electrode, for example, on the first scanning electrode, and contained in the region 6 where the alignment tends to become unstable, when the non-select pulse is applied repeatedly many times after the white or black display is produced by the select pulse, the alignment state may change to twisted alignment, forcing the white or black display to change state and thus causing display unevenness.

FIG. 9 shows another ferroelectric liquid crystal device in which the scanning electrodes 4 are arranged in parallel to the direction of injection of the liquid crystal, i.e., the direction in which the liquid crystal is injected. The only difference between FIG. 9 and FIG. 8 is that the scanning electrodes 4 here are scanned in sequence from bottom to top in the figure along the direction indicated by arrow. In this case also, at the pixel 9' (1, m) on the first selected scanning electrode 4, first the select pulse is applied as shown in FIG. 7, to produce a white or black display. After that, the voltage ±⅓V as the non-select pulse is applied repeatedly as many times as the number of remaining scanning lines. At a pixel located on a low-numbered scanning electrode, for example, on the first scanning electrode, and contained in the region 6 where the alignment tends to become unstable, when the non-select pulse is applied repeatedly many times after the white or black display is produced by the select pulse, the alignment state may change to twisted alignment, forcing the white or black display to change state and thus causing display unevenness.

FIG. 10 shows still another ferroelectric liquid crystal device in which the scanning electrodes 4 are arranged at right angles to the direction of injection of the liquid crystal, i.e., the direction in which the liquid crystal is injected. The only difference between FIG. 10 and FIG. 8 is that the positions of the scanning electrodes 4 and the signal electrodes 5 are interchanged and that the scanning electrodes 4 are scanned in sequence from right to left in the figure along the direction indicated by arrow. In this case also, at the pixel 9 (1, m) on the first selected scanning electrode 4, first the select pulse is applied as shown in FIG. 7, to produce a white or black display. After that, the voltage ±⅓V as the non-select pulse is applied repeatedly as many times as the number of remaining scanning lines. At a pixel located on a low-numbered scanning electrode, for example, on the first scanning electrode, and contained in the region 6 where the alignment tends to become unstable, when the non-select pulse is applied repeatedly many times after the white or black display is produced by the select pulse, the alignment state may change to twisted alignment, forcing the white or black display to change state and thus causing display unevenness.

FIGS. 8 to 10 have each been described by taking as an example the liquid crystal device using a ferroelectric liquid crystal, but it should be recognized that the liquid crystal device using an antiferroelectric liquid crystal involves the same problem.

As described above, in the liquid crystal device having a memory characteristic constructed using a smectic liquid crystal, since no voltage whatsoever is applied during the display screen retention period after the display is written, there has been the problem that once display unevenness occurs, the unevenness remains on the screen and cannot be corrected until the next writing is done, thus being unable to obtain uniform display quality.

It is an object of the present invention to provide a liquid crystal device that can solve the above problem.

It is another object of the present invention to provide a liquid crystal device that uses a smectic liquid crystal and that can produce a uniform display.

A liquid crystal device according to the present invention includes a pair of substrates, a smectic liquid crystal provided between the pair of substrates; an injection hole for injecting therethrough the smectic liquid crystal into a gap formed between the pair of substrates, a plurality of scanning electrodes arranged at right angles to the direction of injection of the smectic liquid crystal between the pair of substrates; a plurality of signal electrodes arranged at right angles to the plurality of scanning electrodes, an alignment film deposited over the plurality of scanning electrodes and the plurality of signal electrodes, and voltage applying means for applying a voltage to the plurality of scanning electrodes in sequence proceeding from a side nearest to the injection hole toward a side farthest therefrom.

Further, a liquid crystal device according to the present invention includes signal electrodes and scanning electrodes arranged in a strip-like pattern between a pair of substrates, an alignment film deposited over the scanning electrodes, and a liquid crystal layer formed from a ferroelectric liquid crystal and sandwiched between the pair of substrates, wherein the scanning electrodes formed in the strip-like pattern are arranged at right angles to the direction of injection of the ferroelectric liquid crystal, and a voltage is applied to the scanning electrodes in sequence proceeding from a side nearest to an injection hole toward a side farthest therefrom.

Preferably, in the liquid crystal device according to the present invention, the alignment film is an SiOx film deposited by oblique evaporation.

Preferably, in the liquid crystal device according to the present invention, the voltage applying means stops applying the voltage to the plurality of scanning electrodes after scanning all of the plurality of scanning electrodes once from the nearest side to the farthest side.

Preferably, in the liquid crystal device according to the present invention, the smectic liquid crystal is a ferroelectric liquid crystal or an antiferroelectric liquid crystal.

Preferably, the liquid crystal device according to the present invention further comprises a plurality of signal electrodes arranged at right angles to the plurality of scanning electrodes.

According to the liquid crystal device of the present invention, since the scanning electrodes located in the region where the alignment tends to become unstable are scanned toward the end of the scanning period, the number of times the non-select pulse is applied to such electrodes after the application of the select pulse can be reduced. This eliminates the possibility of the alignment state changing to twisted alignment and serves to prevent the white or black display from changing state and causing display unevenness. Accordingly, even in regions far from the injection hole of the liquid crystal device, it becomes possible to eliminate display unevenness thereby achieving a uniform display.

Further, in the liquid crystal device according to the present invention, in particular, in the liquid crystal device comprising the scanning electrodes and signal electrodes disposed between the pair of substrates, the SiOx alignment film deposited by oblique evaporation over the electrodes, and the liquid crystal layer formed from a ferroelectric liquid crystal and sandwiched between the substrates, it becomes possible to eliminate display unevenness thereby achieving a uniform display.

BRIEF DESCRIPTION OF THE DRAWINGS

These and other features and advantages of the present invention will be better understood by reading the following detailed description, taken together with the drawings wherein:

FIG. 7 is a diagram showing one example of a drive pulse applied to each pixel;

DETAILED DESCRIPTION OF THE PREFERRED EMBODIMENT

A liquid crystal device according to the present invention will be described below with reference to the drawings, however, it should be noted that the technical scope of the present invention is not limited by the specific embodiments described herein, but embraces the inventions described in the appended claims and their equivalents.

Figure 11:
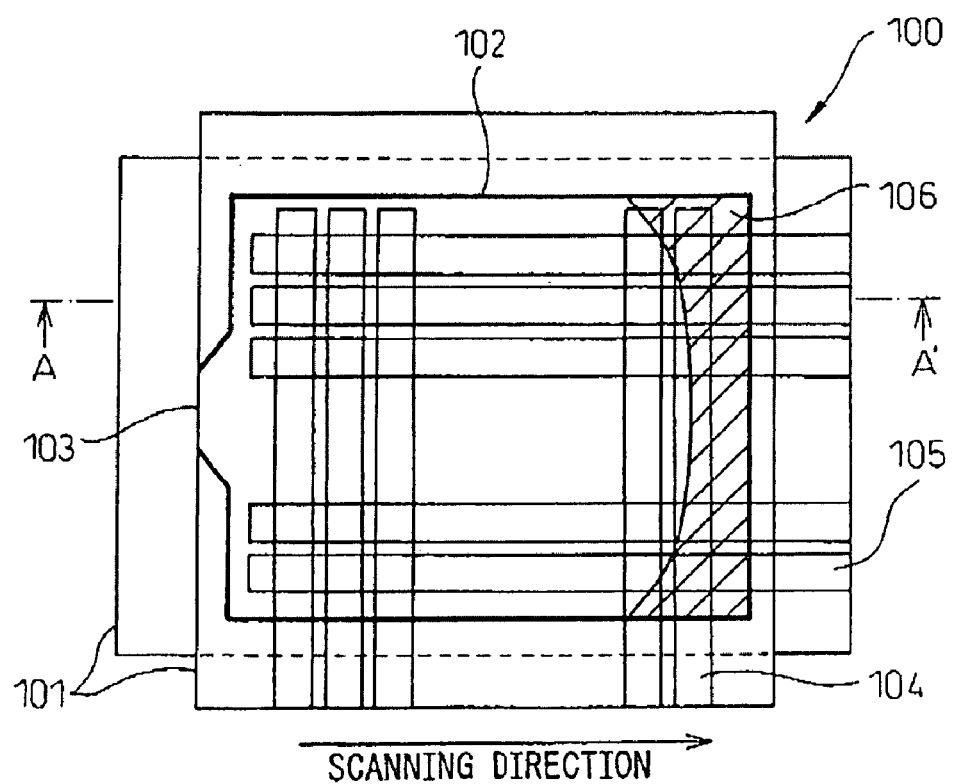
FIG. 11 is a diagram schematically showing a liquid crystal panel used in the present invention.
Figure 12:
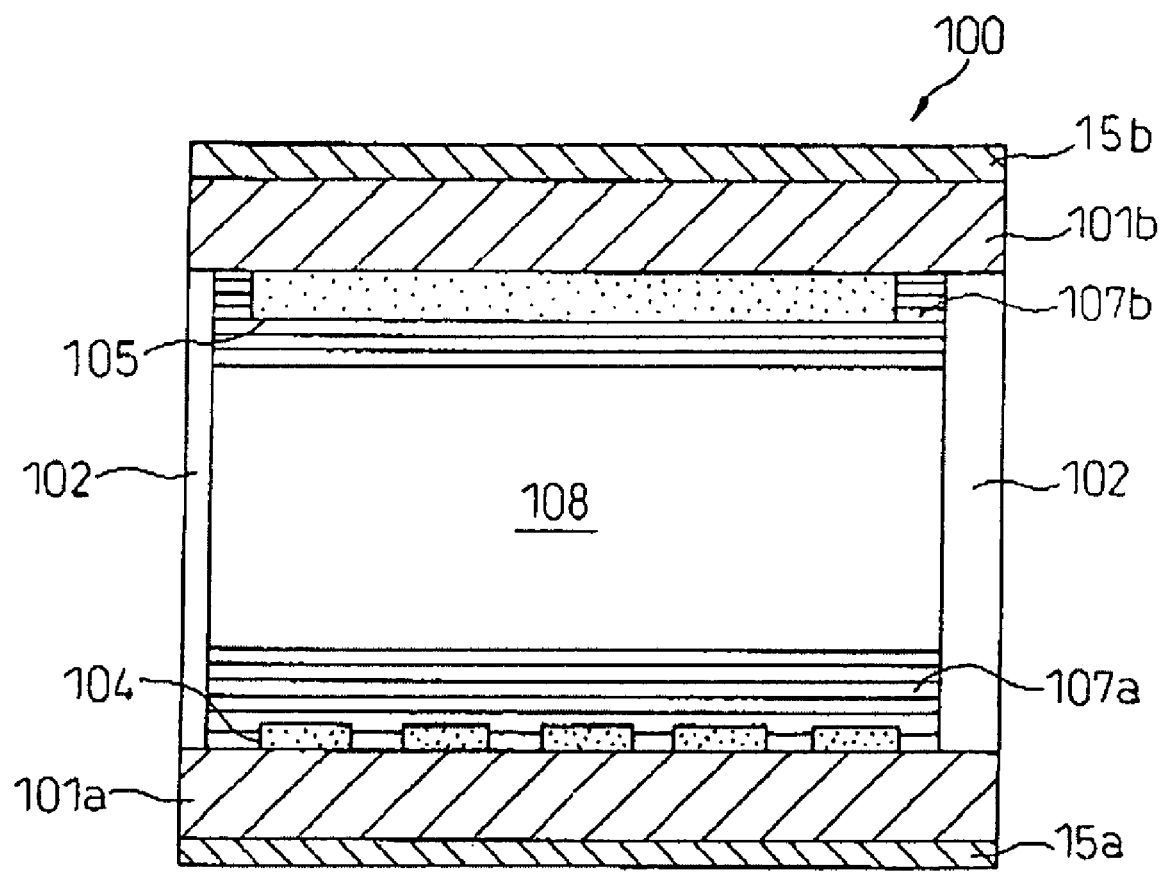
FIG. 12 is a cross-sectional view taken from FIG. 10.

FIG. 11 is a diagram schematically showing a liquid crystal panel 100 used in the present invention, and FIG. 12 is a cross-sectional view taken along line A-A in FIG. 11.

A ferroelectric liquid crystal 108 is sandwiched between two transparent glass substrates 101a and 101b and sealed by a sealant 102. A plurality of scanning electrodes 104 are arranged in a strip-like pattern on the transparent glass substrate 101a. The plurality of scanning electrodes 104 are arranged at right angles to the direction in which the liquid crystal 108 is injected through an injection hole 103. A plurality of signal electrodes 105 are arranged in a strip-like pattern on the transparent glass substrate 101b. A region 106 located far away from the injection hole 103 is the region where the alignment of the liquid crystal 108 tends to become unstable.

Figure 1:
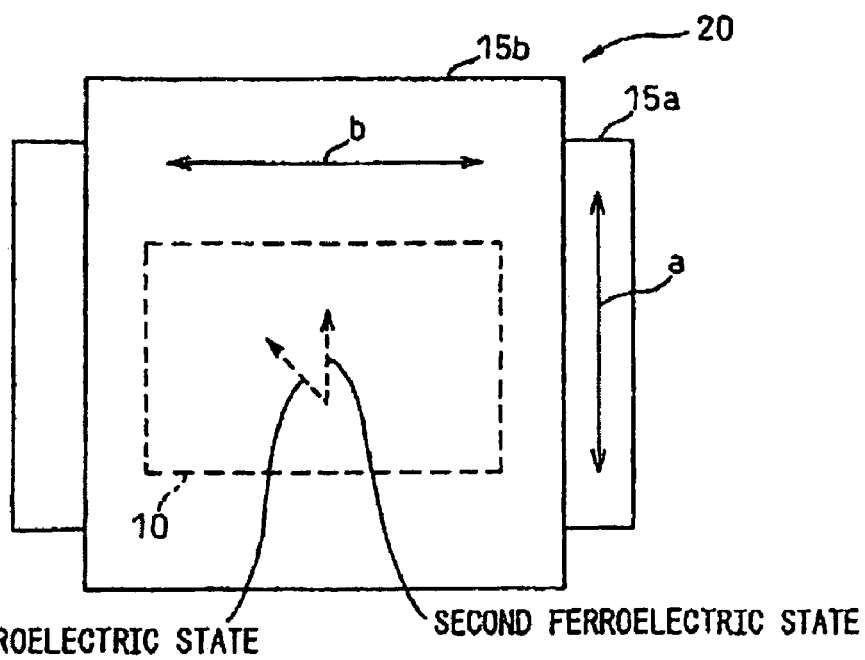
FIG. 1 is a diagram showing one configuration example of a liquid crystal panel that uses a ferroelectric liquid crystal.
Figure 2:
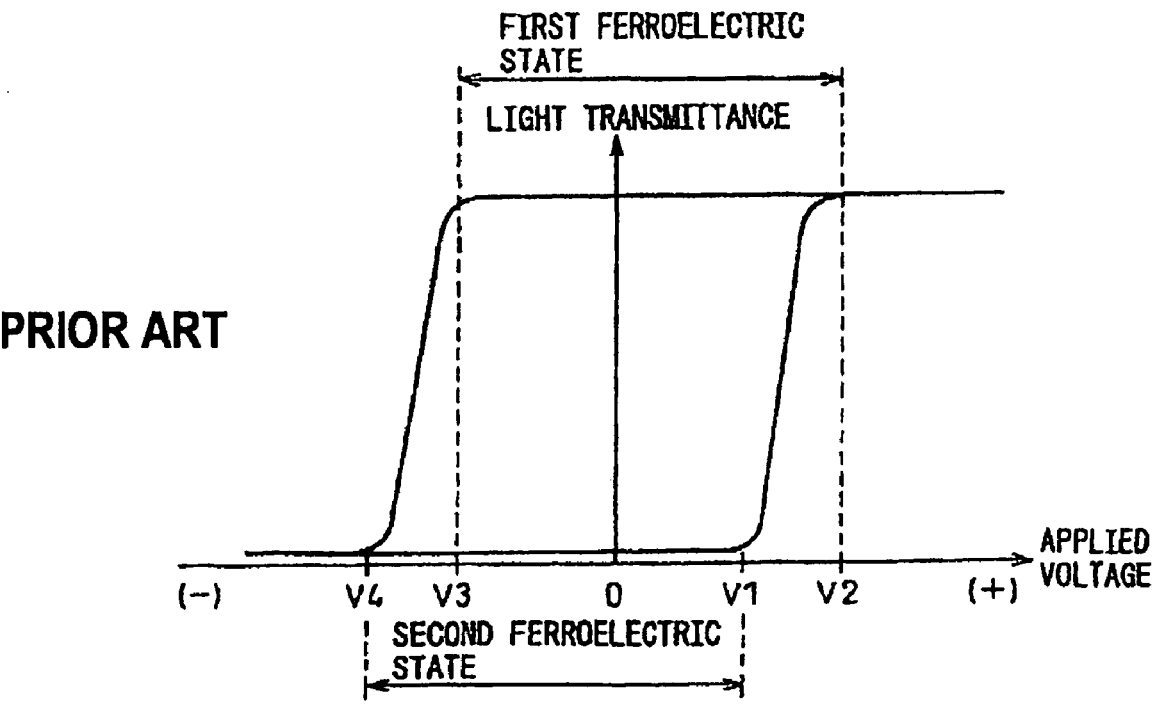
FIG. 2 is a diagram showing the relationship between applied voltage and light transmittance for the ferroelectric liquid crystal.

The ferroelectric liquid crystal 108 exhibits behavior such as described with reference to FIGS. 1 to 2. The polarizers 15a and 15b shown in FIG. 1 are arranged on the outside of the respective transparent glass substrates 101a and 101b.

In the liquid crystal panel 100, the scanning electrodes 104 and signal electrodes 105 made of transparent electrodes are formed on the respective glass substrates 101, and SiO alignment films 107a and 107b are formed by oblique evaporation over the respective electrodes. The pair of glass substrates 101 are held opposite each other with a gap of 1 to 2 μm provided therebetween by interposing spacers (not shown), and are bonded together by the sealant 102. The empty cell thus fabricated is placed in a vacuum environment, and the ferroelectric liquid crystal 108 melted by heating is placed at the injection hole 103 and injected through it into the cell.

Figure 13:
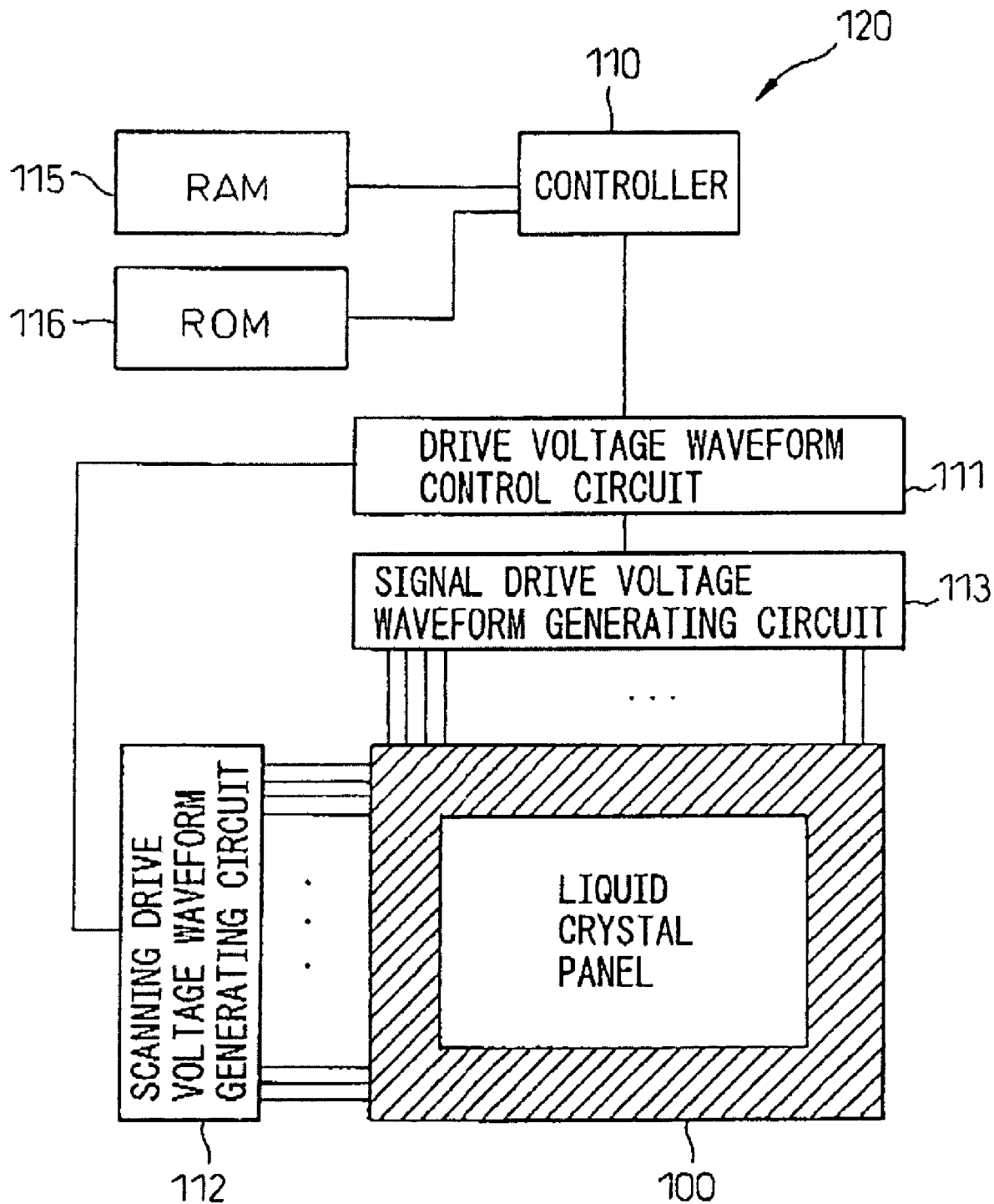
FIG. 13 is a diagram schematically showing the configuration of a liquid crystal device according to the present invention.

FIG. 13 is a diagram schematically showing the configuration of the liquid crystal device 120.

The liquid crystal device 120 comprises, in addition to the liquid crystal panel 100, a controller 110, a drive voltage waveform control circuit 111, a scanning drive voltage waveform generating circuit 112 for applying a voltage waveform to each scanning electrode 104, a signal drive voltage waveform generating circuit 113 for applying a voltage waveform to each signal electrode 105, a display data storage unit 114, a RAM 115, and a ROM 116.

In accordance with a program prestored in the RAM 115 or ROM 116, the controller 110 supplies a control signal to the drive voltage waveform control circuit 111 so that display data stored in the display data storage unit 114 is displayed on the liquid crystal panel 100. In response to the supplied control signal, the drive voltage waveform control circuit 111 controls the scanning drive voltage waveform generating circuit 112 and the signal drive voltage waveform generating circuit 113 so that prescribed voltage waveforms are supplied to the plurality of scanning electrodes 104 and the plurality of signal electrodes 105, respectively.

Figure 6A:
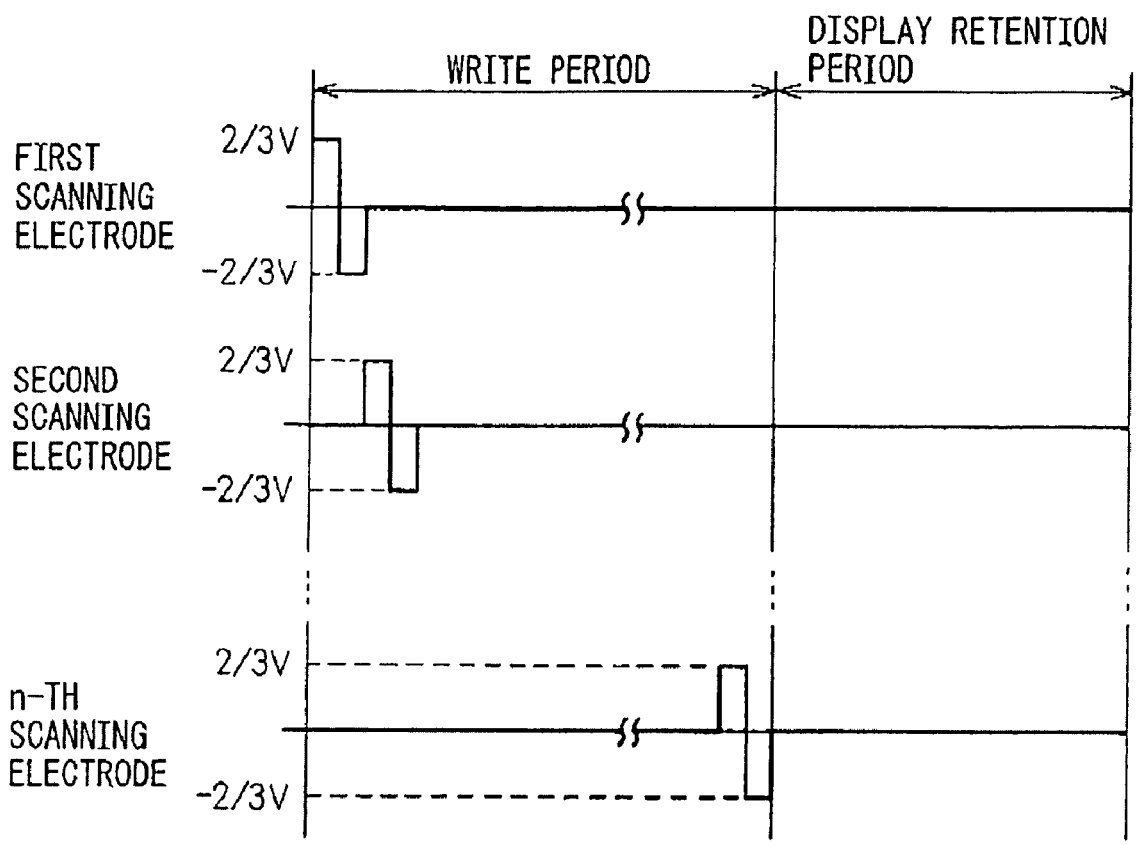
FIG. 6(a) is a diagram showing one example of a pulse applied to each scanning electrode.
Figure 6B:
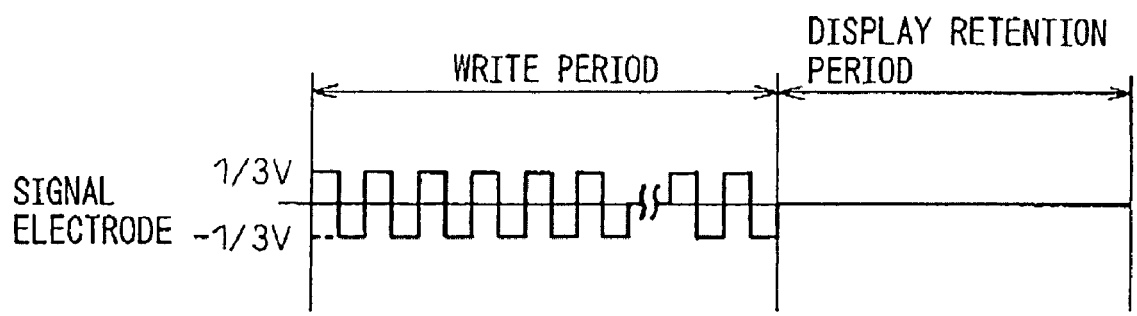
FIG. 6(b) is a diagram showing one example of a pulse applied to each signal electrode.
Figure 8:
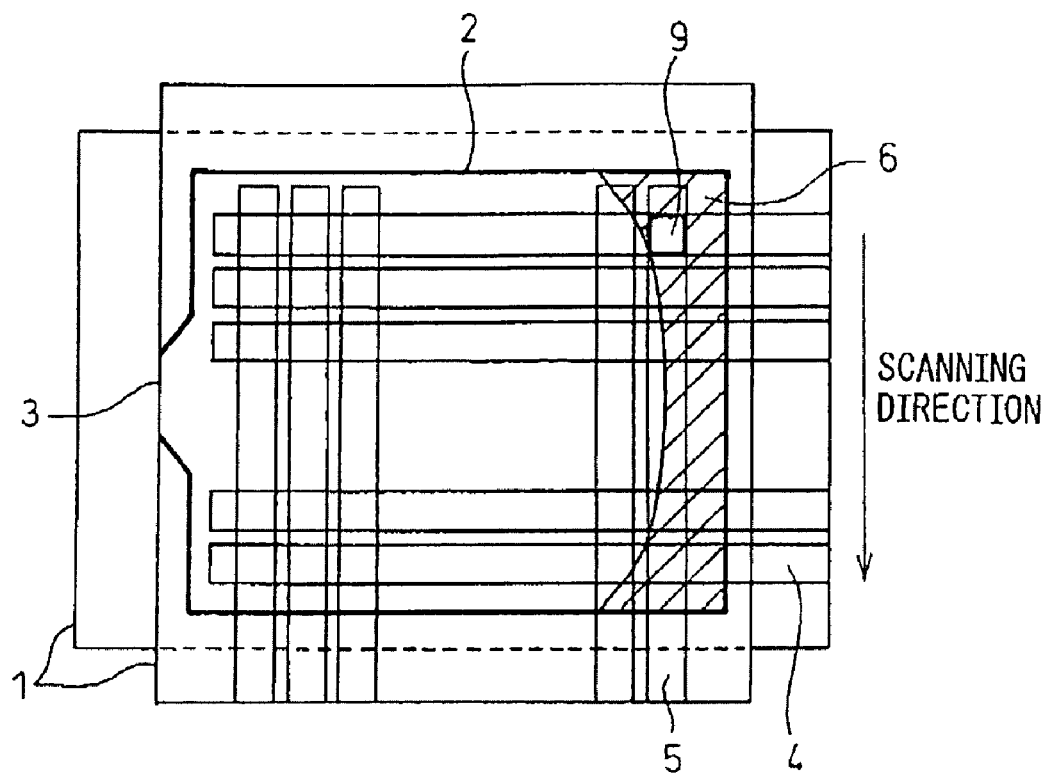
FIG. 8 is a diagram showing one example of a scanning method.
Figure 9:
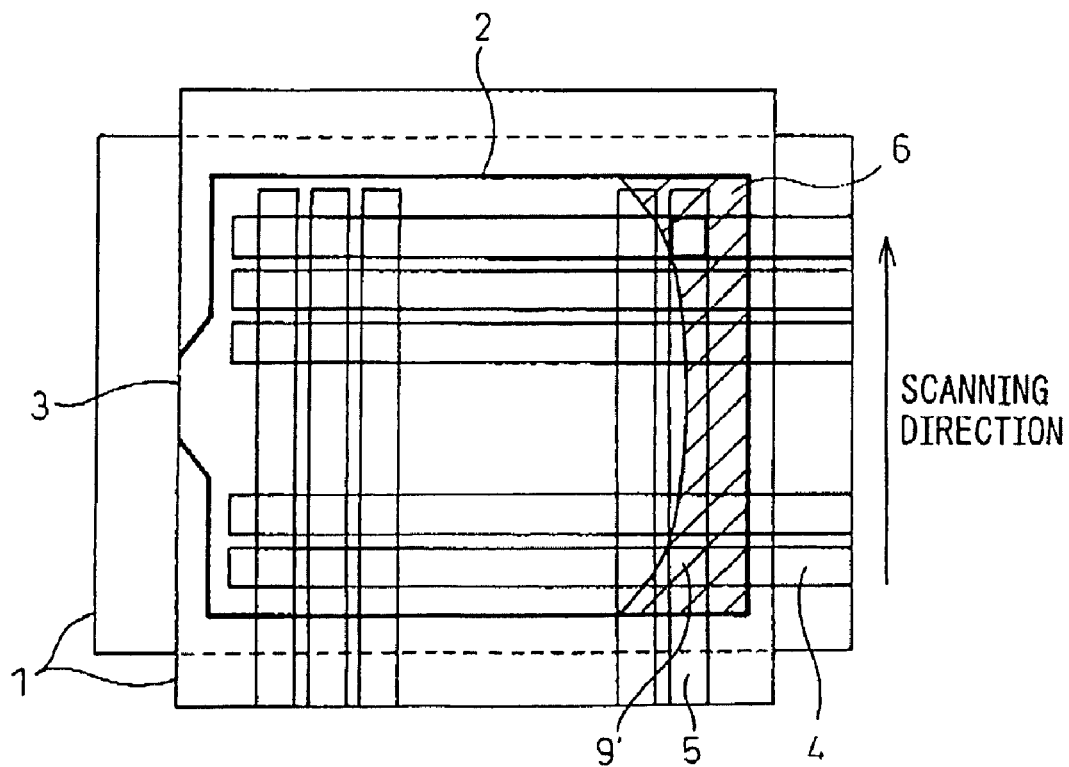
FIG. 9 is a diagram showing another example of a scanning method.
Figure 10:
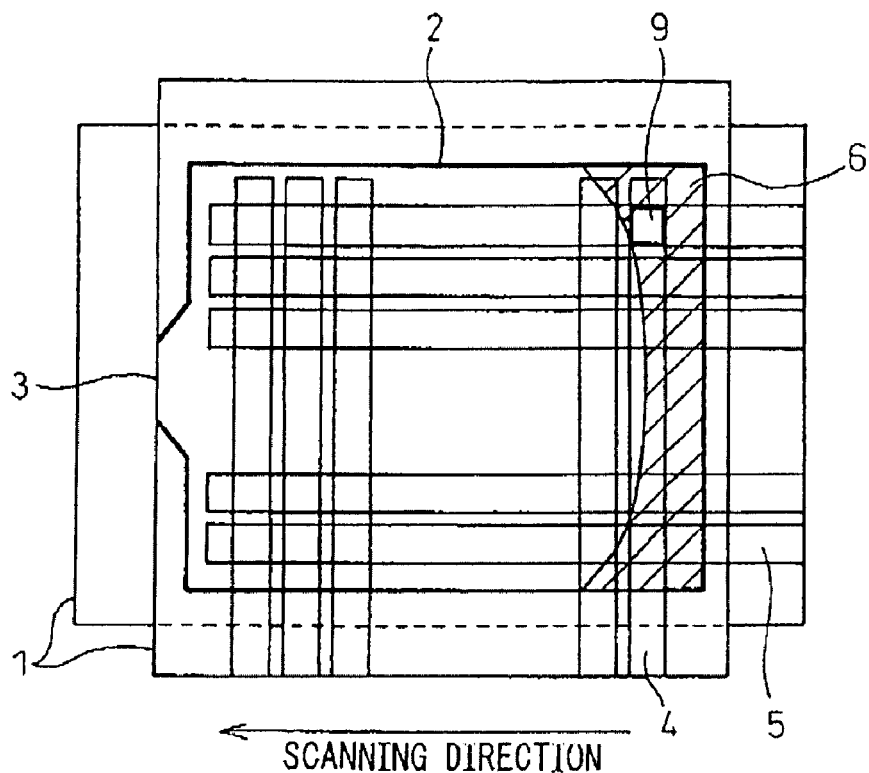
FIG. 10 is a diagram showing still another example of a scanning method.

As earlier described, the scanning electrodes 104 are arranged at right angles to the direction of injection of the liquid crystal 108. The voltage is applied to the scanning electrodes 104 in sequence as shown by arrow, i.e., in the order in which they are arranged along the direction of injection of the liquid crystal 108, starting with the one nearest to the injection hole 103 and proceeding to the one farthest from it. The drive pulses applied to the scanning electrodes 104 and signal electrodes 105 are identical in waveform to those shown in FIGS. 6(a) and 6(b). The drive waveform applied to each pixel is the same as that shown in FIG. 7. In this way, since the scanning electrodes 104 are scanned in sequence in the order in which they are arranged along the direction of injection, starting with the one nearest to the injection hole 103 and proceeding to the one farthest from it, the scanning electrodes 104 located in the region 106 where the alignment tends to become unstable are scanned toward the end of the scanning period, and the number of times the non-select pulse is applied to such electrodes after the application of the select pulse thus decreases. This achieves the effect that, even in the region 106 where the alignment tends to become unstable, the alignment state does not change to twisted alignment and display unevenness does not occur.

The scanning electrodes 104 of the above liquid crystal panel 100 are formed as strip-shaped electrodes, but if they are formed as pixel-shaped electrodes, the same effect can be obtained as long as they are arranged vertically in a strip-like pattern. Further, in the above liquid crystal panel 100, SiO alignment films are used as the alignment films 107, but alternatively, $SiO_2$ films or the like may be used.

In the display device having a memory characteristic, the display need be scanned only once during the write period because the display once written does not disappear, but continues to remain in that state. In the region 106 where the alignment tends to become unstable, since the select pulse is applied toward the end of the drive pulse application period, the number of times the non-select pulse is applied decreases and as a result, the alignment does not change to twisted alignment, and a uniform display free from unevenness can be obtained. For a large-size screen, the system of the present invention is particularly effective to obtain a uniform display free from unevenness, because as the screen size increases the density unevenness of the liquid crystal material becomes more pronounced, and as the number of scanning electrodes increases, the number of times the non-select pulse is applied also increases.

Figure 3:
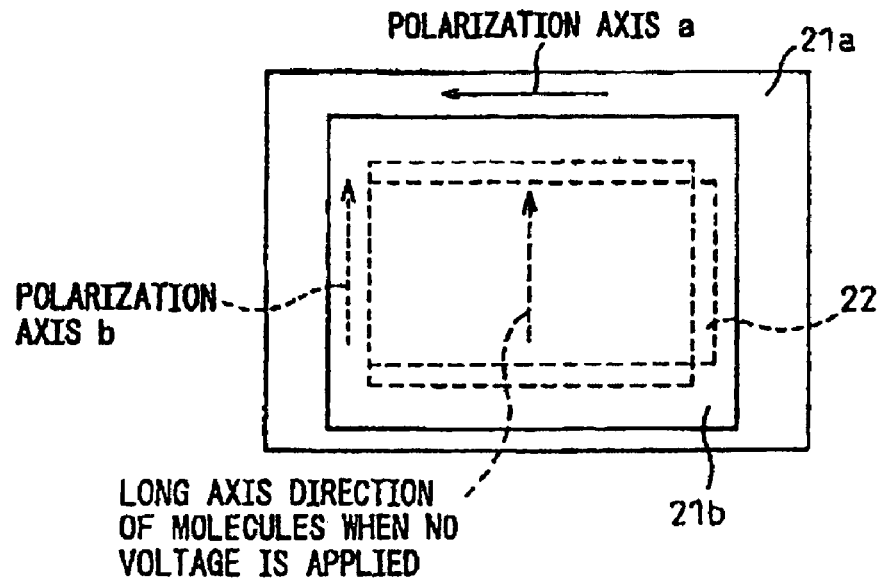
FIG. 3 is a diagram showing one configuration example of a liquid crystal panel that uses an antiferroelectric liquid crystal.
Figure 4:
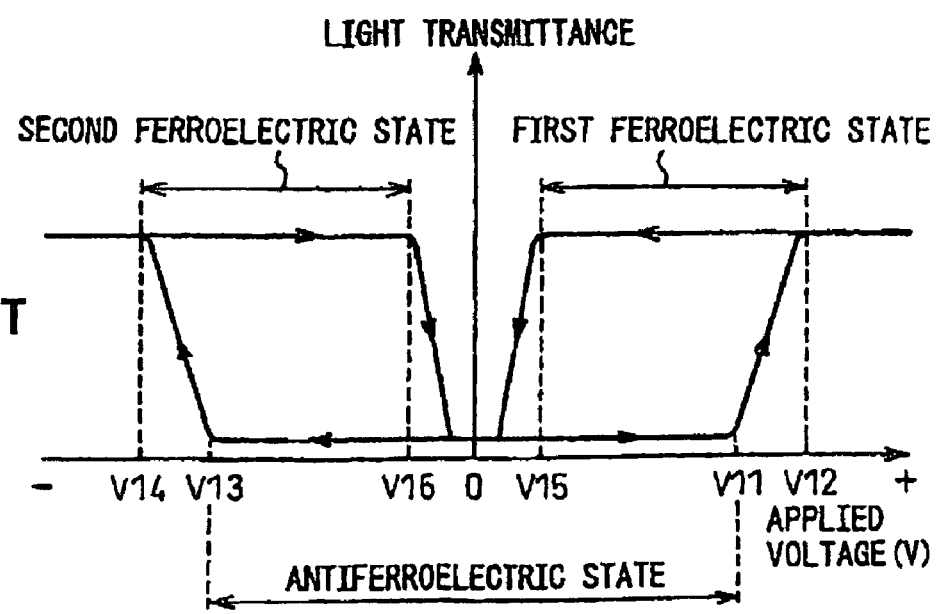
FIG. 4 is a diagram showing the relationship between applied voltage and light transmittance for the antiferroelectric liquid crystal.
Figure 5:
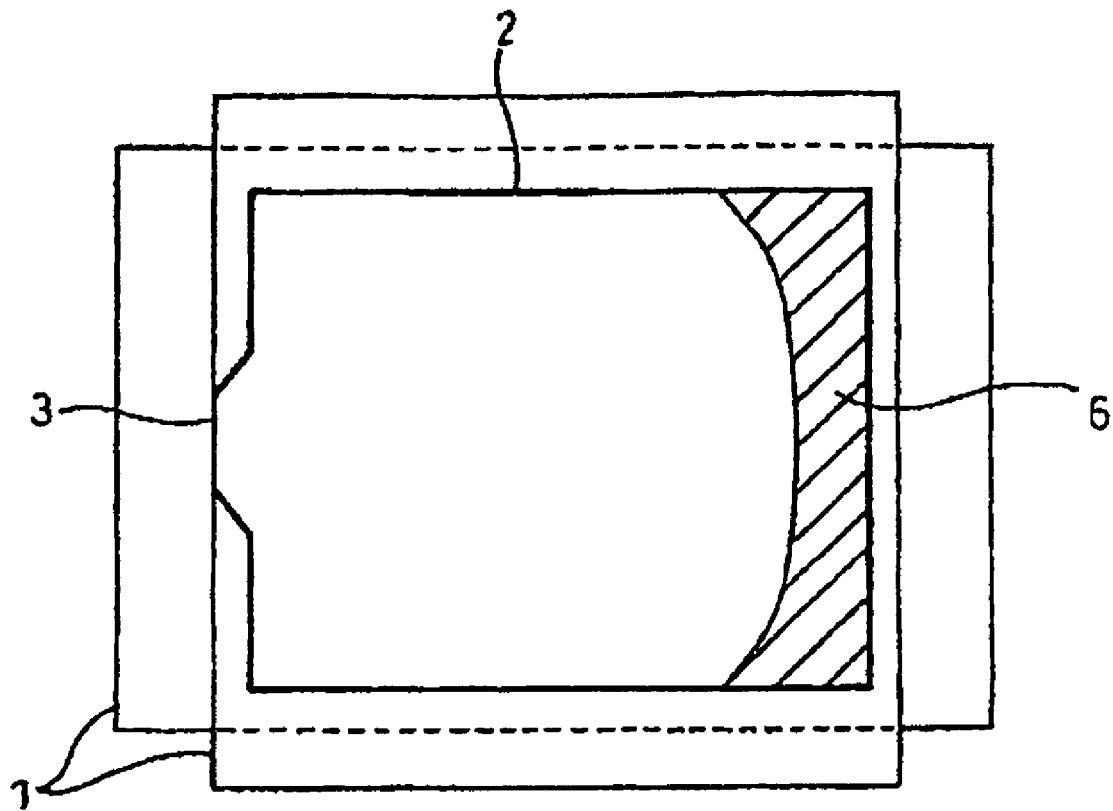
FIG. 5 is a diagram showing a region where alignment tends to become unstable in a liquid crystal panel constructed using a ferroelectric liquid crystal.

The above liquid crystal device 120 has used a ferroelectric liquid crystal, but the antiferroelectric liquid crystal shown in FIGS. 3 and 4 may be used for the liquid crystal device.

What is claimed is:

1. A liquid crystal device comprising:

a pair of substrates;

a smectic liquid crystal provided between said pair of substrates;

an injection hole for injecting therethrough said smectic liquid crystal into a gap formed between said pair of substrates;

a plurality of scanning electrodes arranged at right angles to the direction of injection of said smectic liquid crystal between said pair of substrates, and wherein said plurality of scanning electrodes includes a first scanning electrode which is placed at a side nearest to said injection hole and a last scanning electrode which is placed at a side farthest from said injection hole;

an alignment film deposited over said plurality of scanning electrodes; and voltage applying means for applying a voltage to said plurality of scanning electrodes in sequence proceeding from said first scanning electrode toward said last scanning electrode.

2. The liquid crystal device according to claim 1, wherein said alignment film is an SiOx film deposited by oblique evaporation.

3. The liquid crystal device according to claim 1, wherein said voltage applying means stops applying the voltage to said plurality of scanning electrodes after scanning all of said plurality of scanning electrodes once from said nearest side to said farthest side.

4. The liquid crystal device according to claim 1, wherein said smectic liquid crystal is a ferroelectric liquid crystal or an antiferroelectric liquid crystal.

5. The liquid crystal device according to claim 1, further comprising a plurality of signal electrodes arranged at right angles to said plurality of scanning electrodes.

* * * * *